Figure 1:
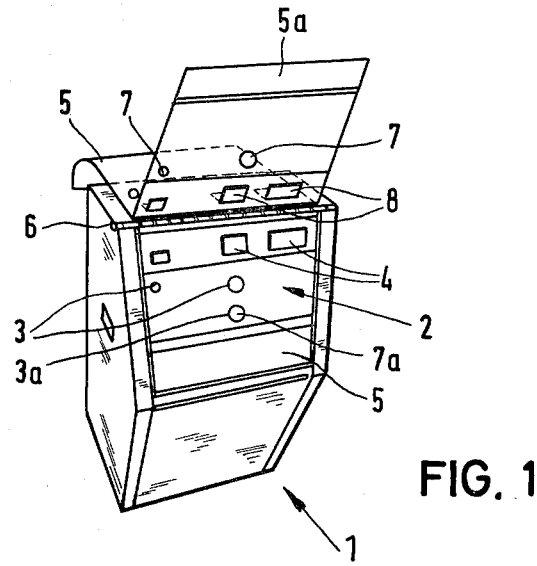

United States Patent [19]

Nippel

[11] 4,231,168
[45] Nov. 4, 1980

[54] INSTRUMENT PANEL TEACHING AID

[75] Inventor: Frank Nippel, Waldbronn, Fed. Rep. of Germany

[73] Assignee: Deutsche Nemectron GmbH, Fed. Rep. of Germany

[21] Appl. No.: 937,096

[22] Filed: Aug. 28, 1978

[30] Foreign Application Priority Data

Aug. 27, 1977 [DE] Fed. Rep. of Germany ....... 2738694

[51] Int. Cl.³ ............................................. G09B 19/00
[52] U.S. Cl. ......................................... 35/39; 35/8 R
[58] Field of Search ................... 35/10, 13, 8 R, 35 E, 35/39

[56] References Cited

U.S. PATENT DOCUMENTS

| 2,874,707 | 2/1959 | Koppel | 35/35 E |
| 3,310,883 | 3/1967 | Young | 35/10 |
| 3,560,964 | 2/1971 | Bedell et al. | 35/5 |
| 4,119,839 | 10/1978 | Beckmann et al. | 35/5 |

Primary Examiner—John W. Shepperd
Attorney, Agent, or Firm—Craig & Antonelli

[57] ABSTRACT

A teaching aid for use with equipment having an instrument panel provided with at least one of operating elements and diagnostic instruments. The teaching aid includes one or more charts which are removable in a predetermined sequence in steps from the instrument panel. The charts located beneath a removed chart in an instruction step are provided with openings associated with the operating elements to be exposed for operation in a given teaching step. The charts located beneath a removed chart in a teaching step may also be provided with windows matching the diagnostic instruments to be exposed for reading in a given teaching step.

12 Claims, 2 Drawing Figures

U.S. Patent    Nov. 4, 1980    4,231,168

INSTRUMENT PANEL TEACHING AID

The present invention relates to a teaching device and, more particularly, to a teaching aid for use with an instrument panel that is provided with operational elements, diagnostic instruments and the like.

Measuring devices and equipment find various applications in many diverse areas and, generally, these devices and equipment are frequently relatively complex in design and operation and continue to become increasingly more complex. Therefore, to achieve optimum results and to avoid damage to the equipment as well as the objects being measured and/or processed, it is imperative that operating personnel be given careful instructions regarding the use and operation of the device or equipment in question.

The need for careful instruction is especially true in the field of medical technology where the medical devices and equipment are frequently operated by personnel who have relatively little technical knowledge, and where an especially high degree of safety must be demanded in view of the interests of patients.

In proposed teaching aids such as, for example, equipment manuals, teaching programs, etc., instruction is relatively time-consuming and it is virtually impossible to reliably eliminate the possibility that the individual being instructed makes mistakes during instruction, which could have disadvantageous consequences with respect to, for example, the equipment operated by the individual.

The aim underlying the present invention essentially resides in providing a teaching aid which makes it possible to rapidly and reliably achieve the particular goal of the instruction being given and which completely eliminates errors during instruction.

According to advantageous features of the present invention, a teaching aid is provided which includes one or more charts, hereinafter referred to as a set of teaching charts, which are removable in a predetermined sequence of steps, one after the other, from the instrument panel of the equipment, with the charts located beneath a chart removed in one instruction step, including openings associated with the operating elements which are to be shown in the instruction step.

A set of teaching charts according to the present invention which, depending upon the equipment for which instruction is given, may consist of only a single chart is mounted on a corresponding instrument panel for instructional purposes. The charts, each of which covers one instructional step, are removed sequentially so that openings in the chart, which were covered before that particular instruction step by the preceding charts, expose the operating elements for operational information of the instruction in question. The chart which exposes a certain operating element is always the lowest chart in the set of teaching charts, which still does not have an opening corresponding to the operating element and removal of which subsequently leads to the exposure of this element. By virtue of the fact that each element is not exposed until it is actuated, positive protection against an incorrect operation is ensured.

Advantageously, according to the present invention, the respective charts are each provided with information which explains the measures pertaining to the instructional step associated with the chart.

During instruction, to ensure that the attention of the individual being instructed is directed only to those diagnostic instruments which should be observed and/or operated, the present invention proposes manufacturing the charts from an opaque material and also proposes that the charts located beneath a chart removed in an instruction step be provided with viewing windows to permit reading of the exposed diagnostic instruments during the instruction step. The viewing windows may be either in the form of openings or transparent areas in the opaque material of the charts.

While the charts in accordance with the present invention may be manufactured of completely opaque material, preferably the charts are dark in color and translucent so that the diagnostic instruments which have not yet been exposed can be located, thereby permitting improved orientation with respect to the instrument panel.

Generally, operating elements and diagnostic instruments of measuring and/or diagnostic equipment stick up above or protrude outwardly from an instrument panel. Consequently, special measures must be taken so as to ensure that the charts rest flat on the instrument panel, rather than at some distance from and at uncontrolled angles with respect to such instrument panel. For this purpose, according to the present invention, the charts are provided with convexities to accommodate the operating elements and diagnostic instruments. Naturally, no convexities need be provided where an opening is already provided so that only the chart which exposes an operating element or diagnostic instrument and the charts located above it will be provided with appropriate convexities.

By appropriately constructing the convexities to ensure that the convexities which are located one above the other will interlock, the entire set of learning charts will rest flat on the instrument panel. Moreover, by so constructing the convexities, protection is provided against the assembling of the charts in the incorrect order since any mistake in assembly would be immediately revealed by the fact that an opening would be located above a convexity, which would be contrary to the proper arrangement of the charts.

To more reliably ensure a proper arrangement of the charts, according to yet another feature of the present invention, provision is made for the convexities to have a larger area than the openings located below them so that it is impossible for a convexity to fit into an opening improperly located above it since, in such case, the set of teaching charts would no longer lie flat when assembled.

From a manufacturing standpoint, it may be desirable to reduce the number of convexities to a minimum. For this purpose, according to a still further feature of the present invention, the charts which lie on top of the "exposing chart" or chart which exposes the actuating elements or diagnostic instruments in a given instruction step are provided with recesses into which the convexities of the charts which expose the actuating elements or diagnostic instruments fit. In the "exposing chart", there would be precisely one convexity for each operating element and/or diagnostic instrument and, beneath such convexity, openings which expose the operating elements and diagnostic instruments, with the recesses for accommodating the convexity being located above the convexity in the chart disposed above the "exposing chart". By virtue of this arrangement, the set of learning charts lies flat and can be made very simply. Additionally, insurance against confusing the sequence of the charts may be realized by providing the convexities with a larger area than the openings located below them.

In many instances, a transition from one instruction step to the next instruction step can only be accomplished when one or more operating elements are in a certain position. To ensure the proper transition in a simple manner, according to the present invention, the operating elements and the associated openings form positively locking structures and the charts are lockable by interlocking structures. The interlocking structures may result from the fact that the operating elements and openings are not round but, for example, oval or have a tab or an associated notch in an edge. In any case, it would be ensured that the chart can only be lifted off the instrument panel when the interlocking structures overlap.

An especially advantageous feature of the present invention resides in the fact that the set of teaching charts may be bound into a pad in such a manner that the individual charts may be flipped over a common edge. For this purpose, the pad of charts may be formed, for example, by clamping the charts edgewise between clamping strips or between a clamping strip and the instrument panel. Additionally, the charts in the pad may be connected together hingewise by an appropriate hinge pin. By virtue of such arrangements, it is quite possible to exchange individual charts, for example, after a change is effected in the device or equipment, and the hinge-like connection would allow the sequence of charts to be determined in a simple fashion by the arrangement of hinge flaps.

A simpler form of interconnecting the charts into a pad from the technical standpoint, which may be more advantageous in many instances, resides in permanently connecting the charts by stapling, gluing or riveting them together more or less permanently.

According to the present invention, means are provided for removably fastening the charts to the instrument panel, whereby the respective charts can be removed if an instruction has been successfully carried out. The removable mounting or fastening means may be in the form of, for example, a clamping strip, a magnetic holder, screws or hooks provided on the instrument panel from which the charts may be suspended.

Accordingly, it is an object of the pesent invention to provide a teaching aid which avoids, by simple means, drawbacks and disadvantages encountered in the prior art.

Another object of the present invention resides in providing a teaching aid which permits a method of instruction which is very clearly and logically divided into individual instructional steps so that the intended goal of instruction can be rapidly and reliably attained.

Yet another object of the present invention resides in providing a teaching aid with which instruction in the use of a particular device or piece of equipment can be provided in a clear and comprehensible fashion so as to yield rapid and reliable results.

A further object of the present invention resides in providing a teaching aid which ensures that, for all practical purposes, an improper operation during instruction is eliminated.

A still further object of the present invention resides in providing a teaching aid which is readily adaptable to not only changes in the equipment, but also in the method of instruction.

An additional object of the present invention resides in providing a teaching aid which readily permits the interchangeability of instructional information.

Figure 2:
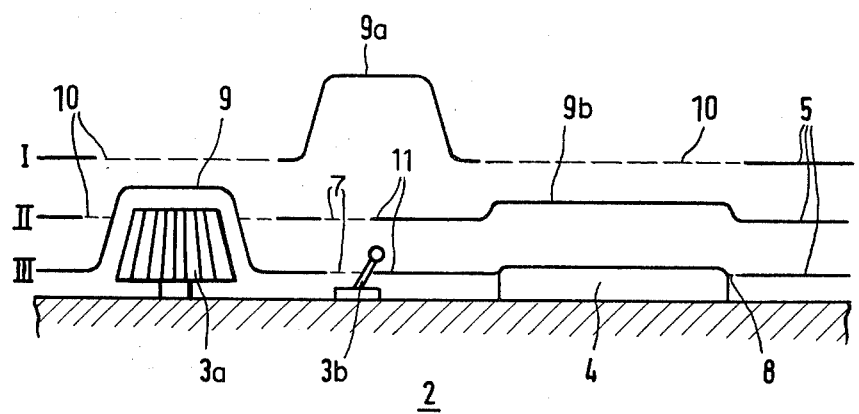

These and other objects, features and advantages of the present invention will become more apparent from the following description when taken in connection with the accompanying drawings which show, for the purposes of illustration only, one embodiment in accordance with the present invention, and wherein:

FIG. 1 is a perspective view of an electromedical device having a teaching aid in accordance with the present invention mounted thereon; and FIG. 2 is a somewhat schematic cross-sectional view through a portion of an instrument panel of the medical device of FIG. 1 with the teaching aid of the present invention mounted thereon.

Referring now to the drawings wherein like reference numerals are used in both views to designate like parts and, more particularly, to FIG. 1, for example, an electromedical device generally designated by the reference numeral 1 is provided with an instrument panel generally designated by the reference numeral 2. Operating elements 3 such as, for example, switches, knobs, etc., are arranged at the instrument panel 2 along with diagnostic instruments 4. A set of charts 5 is mounted on the instrument panel 2 and fastened by hooks (not shown) to the instrument panel 2. The charts 5 are connected together in an articulated fashion by a hinge 6.

FIG. 1 illustrates the manner in which the charts 5, from preceding instruction steps, rest on a top of the instrument panel 2, as well as the manner in which a chart 5a may be removed while the other charts 5 remain stacked along the front of the instrument panel 2. As evident from the removed chart 5a, the respective charts 5 may be provided with one or more openings 7 and one or more windows 8. The openings 7 and windows 8 are arranged so as to be aligned with predetermined operating elements 3 and diagnostic instruments 4, respectively, corresponding to the instruction of the given chart when that chart is disposed over the instrument panel 2.

As evident from FIG. 1, the arrangement or orientation of the corresponding openings 7 and windows 8 in the chart 5a was such that the operating elements 3 and the diagnostic instruments 4 were exposed before the illustrated teaching step. In the illustrated teaching step shown in FIG. 1, an operating element 3a has been exposed by virtue of the fact that, in contrast to the chart 5a which has been removed, charts 5, located beneath the chart 5a on the instrument panel 2, have openings 7a which match the position of the operating element 3a.

Other operating elements 3 and diagnostic instruments 4 may be concealed by the remaining charts 5 arranged on the face of the instrument panel 2, with the other elements 3 and diagnostic instruments 4 being subsequently exposed only at later stages of instruction. In the illustrated embodiment, the charts 5 are dark in color and translucent in order to permit a certain degree of orientation of the elements with respect to the overall instrument panel 2. Additionally, the windows 8 are constructed in the form of openings provided in the respective charts.

FIG. 2 provides a schematic representation of a cross-sectional view of the instrument panel 2 with a diagnostic instrument 4 and with operating elements 3 illustrated as, for example, a knob 3a and a switch 3b. For the sake of clarity, the charts 5 are illustrated as being spaced from each other by some distance; however, the respective charts 5 are nested or stacked so that the charts 5 lie substantially flat on the top of the electromedical device 1 and at the instrument panel 2. The reference numerals I, II, III designate different layers or stages of the charts 5 which, in turn, may represent different instructional levels.

One or more convexities 9, 9a, 9b are provided in the respective charts for covering predetermined operating elements 3 and/or diagnostic instruments 4. For example, in the illustrated embodiment, the convexity 9 is disposed so as to cover the knob 3a, while the convexities 9a, 9b cover the switch 3b and diagnostic instrument 4, respectively. The provision of the convexities 9, 9a, 9b ensures that the charts 5 lie flat on the instrument panel 2.

Charts 5 which may be arranged above a chart having convexities 9 are provided with recesses or openings 10 which are adapted to fit over the respective convexities 9. For this purpose, the convexities 9, 9a, 9b and the openings 10 are dimensioned so that the convexities 9, 9a, 9b fit into the associated openings 10. Also, in each case, the charts 5 located beneath a convexity 9 in a chart are provided with openings 7 or windows 8, also in the form of openings, having an area which is smaller than an area of the convexity 9 located above the openings 7 or windows 8.

If chart I of FIG. 2 is removed, the switch 3b, which prior to removal was covered by convexity 9a in chart I, will be revealed because the subsequent charts II, III have openings 7 provided beneath the convexity 9a. During the next teaching step, the diagnostic instrument 4 would be revealed since, during such step, the chart II would be removed. In a subsequent instructional step, the chart III would be removed, thereby revealing the knob 3a which, for example, could be connected with a potentiometer, depending on what is printed on the chart III. Operation of the knob 3a may result in a predetermined value being set for reading on the diagnostic instrument 4 which was revealed upon removal of the chart II.

It might be desirable that one instruction step can only be accomplished when one or more operating elements are in a certain position. An embodiment is shown in FIG. 2 with regard to the switch 3b. It can be seen that the openings 7 in the charts II and III are arranged eccentrically with respect to the switch so that these charts project with edges 11—in FIG. 2 on the right side of the switch—beneath the operating lever of the switch 3b. The charts II and III can only be lifted off the instrument panel when the lever has been operated into the left hand position—not shown.

While I have shown and described only one embodiment in accordance with the present invention, it is understood that the same is not limited thereto, but is susceptible of numerous changes and modifications as known to a person having ordinary skill in the art, and I therefor do not wish to be restricted to the details shown and described hereinabove, but intend to cover all such changes and modifications as are encompassed by the scope of the appended claims.

I claim:

1. A teaching aid for instructing use or operation of equipment having an instrument panel provided with at least one of operating elements and diagnostic instruments, the teaching aid comprising:
chart means for providing information regarding predetermined instructional levels, said chart means being adapted to be mounted in an overlying relationship on the instrument panel, and
wherein a plurality of such chart means are provided so as to provide a plurality of individual instructional levels as the respective chart means are removed in a predetermined sequence; and
means on said chart means for exposing only the operating elements or diagnostic instruments corresponding to a particular instructional level of said chart means.

2. A teaching aid for instructing use or operation of equipment having an instrument panel provided with at least one of operating elements and diagnostic instruments, the teaching aid comprising:
chart means for providing information regarding predetermined instructional levels, said chart means being adapted to be mounted in an overlying relationship on the instrument panel; and
means on said chart means for sequentially exposing operating elements or diagnostic instruments corresponding to a particular instructional level of said chart means.

3. A teaching aid for instructing use or operation of equipment having an instrument panel provided with at least one of operating elements and diagnostic instruments, the teaching aid comprising:
chart means for providing information regarding predetermined instructional levels, said chart means being adapted to be mounted in an overlying relationship on the instrument panel; and
means on said chart means for exposing only the operating elements or diagnostic instruments corresponding to a particular instructional level of said chart means, said chart means further including a plurality of convex projections which are adapted to fit over the operating elements or diagnostic instruments which do not correspond to the instructional level of said chart means.

4. A teaching aid according to claim 2, wherein said exposing means includes openings provided in said chart means, said openings being adapted to be positioned relative to the operating elements of the instructional level of the chart means so as to permit access to said operating elements.

5. A teaching aid according to claim 4, wherein said chart means is constructed of an opaque material, and wherein the exposing means further includes windows associated with the diagnostic instruments of the instructional level of the said chart means.

6. A teaching aid according to claim 3, wherein the convex projections between said plurality of charts are of varying size so as to prevent said chart means from being stacked in an improper sequence.

7. A teaching aid according to claim 6, wherein openings are provided in at least some of said plurality of chart means, which are adapted to receive the convex projections of lower chart means so as to permit the plurality of chart means to be mounted on the instrument panel in an essentially flat manner.

8. A teaching aid in accordance with one of claims 6 or 7, wherein the operating elements and associated openings are provided with matching interlock means so as to lock the plurality of chart means together.

9. A teaching aid according to claim 8, wherein means are provided for binding the plurality of chart means along a common edge so as to form a pad of the plurality of chart means.

10. A teaching aid according to claim 9, wherein said binding means includes a hinge pin, and wherein means are provided for mounting the hinge pin to the instrument panel so as to permit the respective chart means to be selectively flipped over the common edge.

11. A teaching aid according to one of claims 5 or 1, wherein means are provided for removably fastening the chart means to the instrument panel.

12. A teaching aid for instructing use or operation of equipment having an instrument panel provided with at least one of operating elements and diagnostic instruments, the teaching aid comprising:

chart means for providing information regarding predetermined instructional levels, said chart means being adapted to be mounted in an overlying relationship on the instrument panel;

means for removably fastening the chart means to the instrument panel; and means on said chart means for exposing only the operating elements or diagnostic instruments corresponding to a particular instructional level of said chart means.

* * * * *